United States Patent [19]

Uemura

[11] 3,735,216
[45] May 22, 1973

[54] MOTOR CONTROL SYSTEM

[75] Inventor: Saburo Uemura, Kanazawa-ku, Yokohama, Japan

[73] Assignee: Sony Corporation, Tokyo, Japan

[22] Filed: Feb. 14, 1972

[21] Appl. No.: 225,923

[30] Foreign Application Priority Data

Feb. 13, 1971 Japan..................................46/6323
Feb. 13, 1971 Japan..................................46/6324

[52] U.S. Cl.................................318/138, 307/88 LC

[51] Int. Cl..............................................H02k 29/00

[58] Field of Search......................318/138, 254, 439; 307/88 LL, 88 P

[56] References Cited

UNITED STATES PATENTS

| | | | |
|---|---|---|---|
| 3,627,896 | 12/1971 | Uemura | 318/138 |
| 3,529,220 | 9/1970 | Kobayashi | 318/138 |
| 3,466,519 | 9/1970 | Platnick | 318/138 |
| 3,452,262 | 6/1969 | Mogzala | 318/138 |
| 3,439,243 | 4/1969 | Roth | 318/138 |

Primary Examiner—Bernard A. Gilheany
Assistant Examiner—Thomas Langer
Attorney—Lewis H. Eslinger, Alvin Sinderbrand and Curtis, Morris & Safford

[57] ABSTRACT

A motor control system including a modulator consisting of a saturable reactor, a magnet means and a control means. The magnet means produces a magnetic flux to be supplied to the reactor, which is controlled by the control means, so that the switching means is controlled through the magnet means by the saturable reactor.

18 Claims, 32 Drawing Figures

Patented May 22, 1973   3,735,216

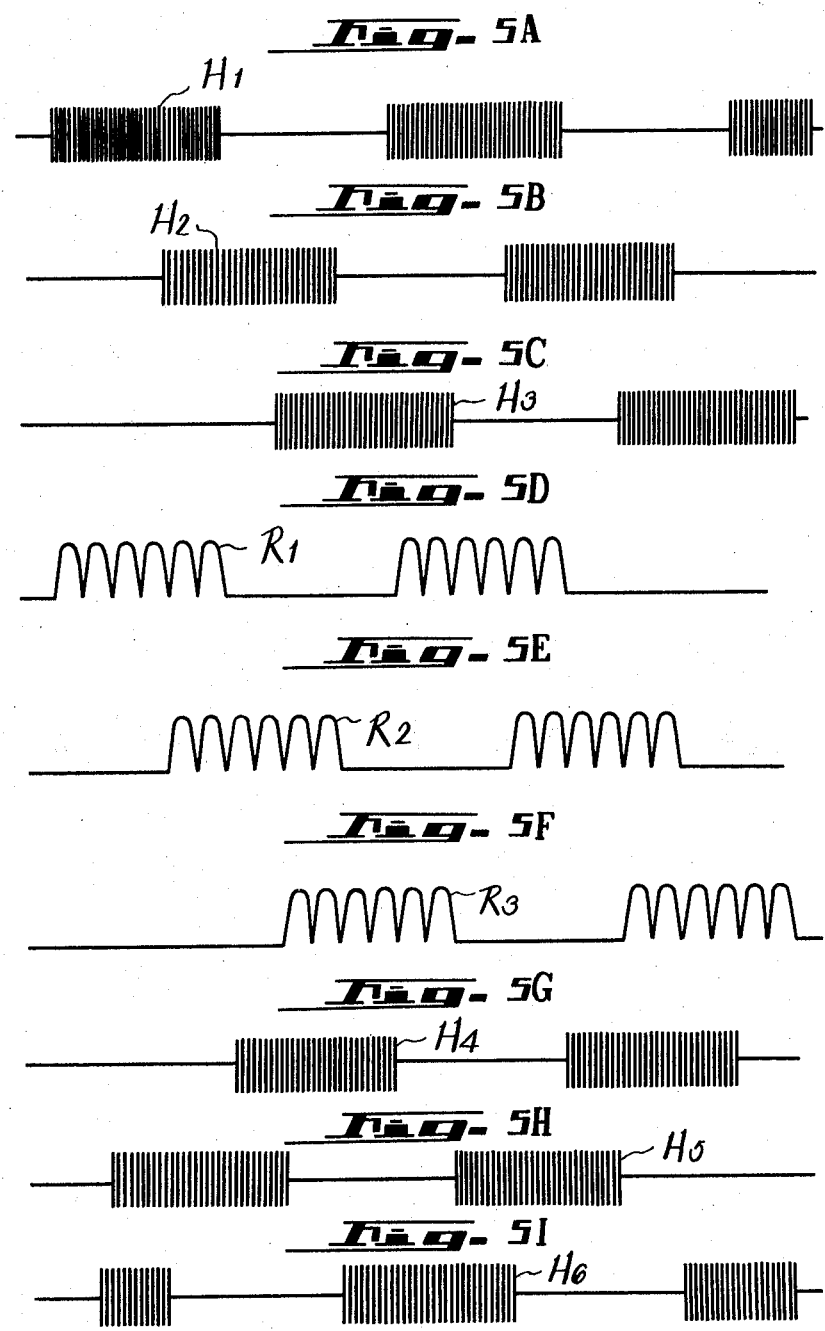

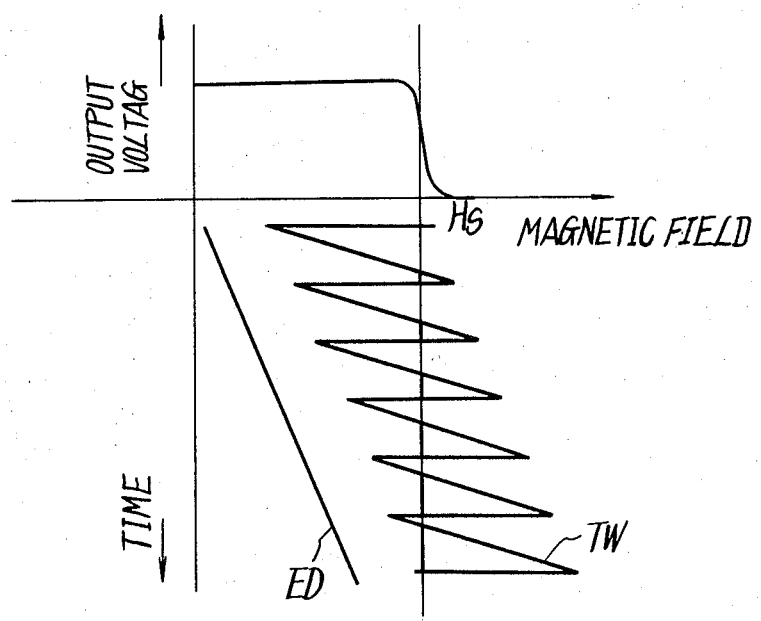
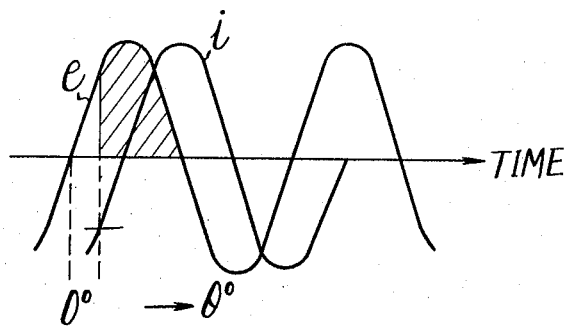

Ic

MOTOR CONTROL SYSTEM

BACKGROUND OF THE INVENTION

1. Field of the Invention

This invention relates to an improved motor control system using saturable reactors. More particularly it relates to an improved simple motor control system for varying rotating speed of a motor or reversing the rotation thereof or both.

2. Description of the Prior Art

One known technique for controlling the rotating speed of a motor is to vary the gate angle of silicon-controlled rectifiers connected to field coils of the motor. There is no problem if the rotor rotates in only one direction. However, it is impossible for the silicon-controlled rectifiers to change the rotational direction of the rotor continuously from one direction to the reverse direction, because the silicon-controlled rectifiers are one-way rectifier elements. Therefore, two sets of silicon-controlled rectifiers and rotating position detecting devices are required for each of the field coils to change the direction of rotation of the motor. The requirement for two rectifiers for each field coil makes it impossible to manufacture such a motor at a low cost.

Another way of controlling switching circuits in field coils is by means of saturable reactors. The saturable reactors are excited by an oscillator and outputs of the reactors are varied by the positioning of the rotor, whereby the positioning of the rotor can be detected. Using this approach, it is possible to manufacture a low cost motor. However, no consideration is given to changing the direction of rotation of the rotor continuously from one direction to the reverse direction.

There is still another system for deriving a control signal from a signal having a frequency proportional to the rotation numbers of the rotor from a signal generator individual to the rotor in order to maintain a DC motor at a predetermined rotating speed. In such a system, if the rotating speed of the rotor is faster than the predetermined rotating speed, the frequency of the signal generator increases. Then the increment signal corresponding to the increased frequency is fed back to a control circuit connected to a motor power source to reduce the power to be supplied to the motor. On the other hand, when the rotating speed of the rotor is slower than the predetermined rotating speed, the signal of the frequency generator decreases. Then, the decrement signal is fed back to the control circuit to cause more power to be supplied to the motor. In this motor control system, the motor has a long lifetime, because the rotating speed of the rotor can be detected without any mechanical contact due to the use of the frequency generator. This system has a disadvantage that smooth operation of the control circuit cannot be effected under transient conditions, because the power lines are directly turned on and off. Further, in this motor control system a signal output signal of the frequency generator is converted into a direct voltage signal through a filter and a rectifier, the direct voltage signal is compared with a reference voltage, and then a control signal is produced based on the comparison. Therefore, when the motor is driven at a slower rotating speed, lack of accuracy is introduced into the voltage comparison because ripple components are superposed upon the detected output. Since the motor control circuit is directly controlled by the control signal derived from a comparison circuit, it is necessary to provide means for eliminating the mutual interference of a drive circuit and the control circuit in the motor control system.

It is, therefore, a general object of this invention to provide an improved motor control system which eliminates the above-described disadvantages.

Another object of this invention is to provide an improved motor control system having saturable transformers which act as saturable reactors suitable for detecting the rotating position of the motor and can easily detect the positioning of the rotor.

Another object of this invention is to provide an improved motor control system which is adapted to control the motor speed by varying the strength of the biasing magnetic field applied to saturable transformers acting as saturable reactors.

Still another object of this invention is to provide an improved motor control system wherein a linear relation is established between a control current for controlling the motor speed and a load current flowing through the motor so that the motor control may be easily made.

Still another object of this invention is to provide an improved motor control system wherein the motor can be controlled by separating motor speed controlling means from a load circuit for the motor in direct signal.

A further object of this invention is to provide an improved motor control system in which the motor can be continuously and smoothly changed from one direction to the reverse direction by varying the direction of the biasing magnetic field applied to saturable transformers acting as saturable reactors for detecting the rotating position of the rotor.

A still further object of this invention is to provide an improved motor control system which is low in cost and easy to handle.

SUMMARY OF THE INVENTION

This invention is directed to a motor control system wherein switching circuits are provided at a motor connected to a power supply, and the switching characteristic of the switching circuits is varied by the outputs of the saturable reactors having a control means. High frequency gating signals are coupled through the transformer only when the transformer is not saturated. A biasing field saturates the transformer and is reduced or canceled by a reverse field, and the net biasing determines the amount of coupling. The transformer output signal is used to gate rectifying semiconductors.

BRIEF DESCRIPTION OF THE DRAWINGS

FIGS. 5A–5I are waveforms showing signals occurring in the saturable transformers and currents flowing through field coils of the motors in FIG. 1.

FIG. 7 is a graph showing difference voltage and high frequency signals supplied to a width modulator in relation to an output characteristic curve of the width modulator.

FIGS. 9 through 11 are graphs for the explanation of the operation of the embodiment of FIG. 8.

DESCRIPTION OF THE PREFERRED EMBODIMENTS

Figure 1:
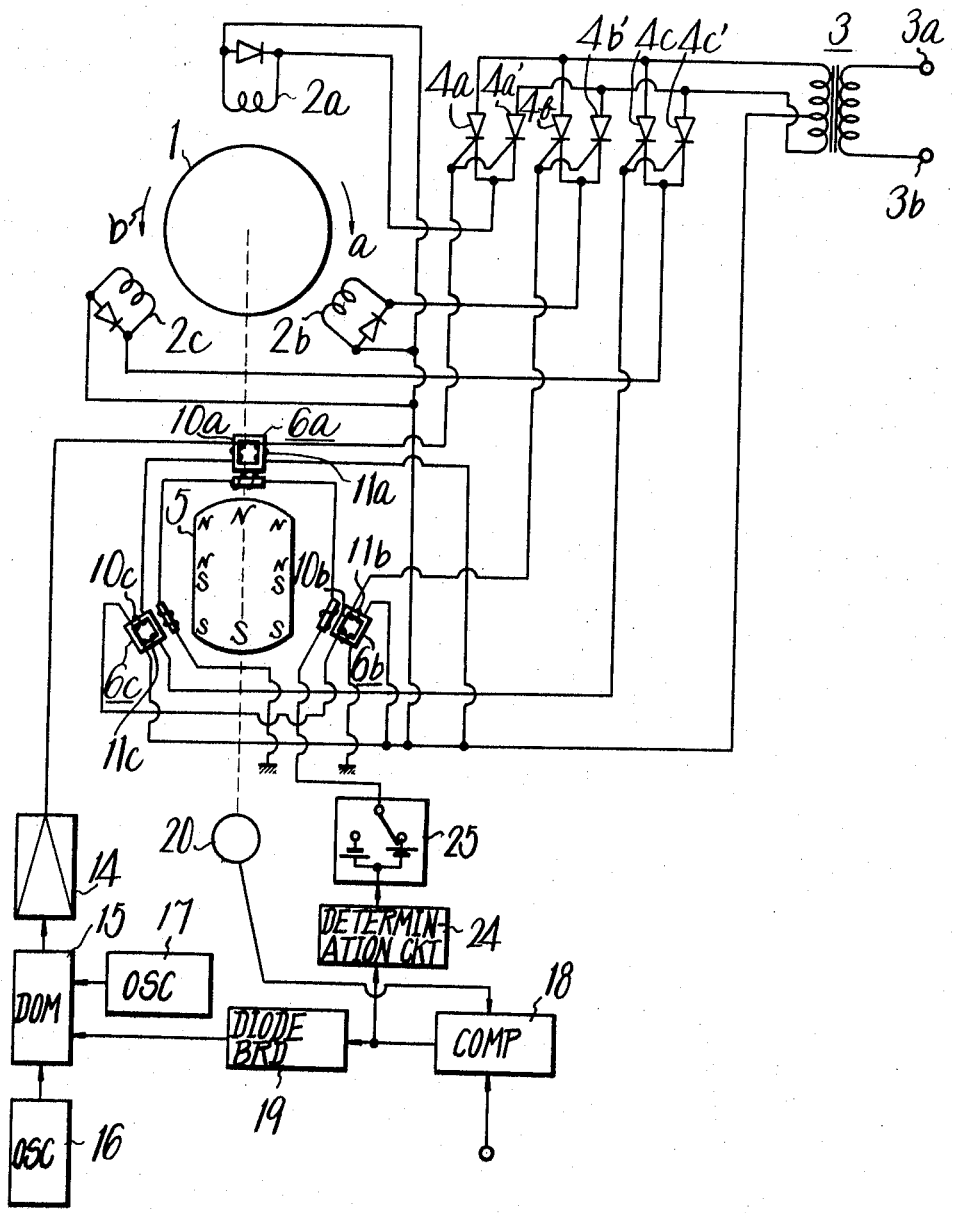
FIG. 1 is a circuit diagram showing a brushless motor incorporating a motor control system according to this invention

FIG. 1 shows schematically a solid-state commutated, or brushless, motor having a circular rotor 1 provided with a pair of north and south poles N and S at diametrically opposite parts of the periphery. Either a permanent magnet or an electromagnet may be used as the circular rotor 1. Further, in this case, several pairs of north and south poles may be provided instead of a single pair of poles. Three field windings 2a, 2b, and 2c are wound around stator cores surrounding the rotor 1 in the proximity of the periphery of the rotor 1 and are angularly spaced from one another by 120°. One end of each of these field windings 2a, 2b, and 2c is connected to a common center tap of a secondary winding of a transformer 3. An alternating signal from a commercially available power supply (not shown) is applied across both ends 3a and 3b of the primary winding of the transformer 3. One end of the secondary winding of the transformer 3 is connected to the respective anodes of silicon-controlled rectifiers 4a, 4b, and 4c (hereinafter referred to as SCR's) and the other end of the secondary is connected to the respective anodes of SCR's 4a', 4b', and 4c '. The cathodes of the SCR's 4a and 4a' are connected to each other and to the other end of the field coil 2a, the cathodes of the SCR's 4b and 4b' are connected to the other end of the field coil 2b, and the cathodes of the SCR's 4c and 4c' are connected to the other end of the field coil 2c.

A magnetic field generator 5 is connected mechanically to the rotor 1 to rotate therewith. The magnetic field generator 5 comprises a magnetic disk permanent magnet in which flat portions are formed on opposite sides leaving rounded ends which are oppositely magnetically polarized. Three saturable transformers 6a, 6b, and 6c acting as saturable reactors are angularly spaced from one another by 120° around the periphery of the magnetic field generator 5 similarly to the field coils 2a, 2b, and 2c.

Figure 2:
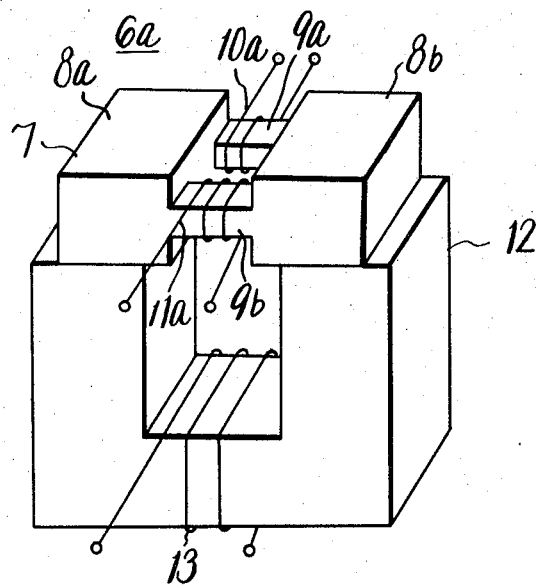
FIG. 2 is a perspective view of a saturable transformer and biasing magnet means of a type that may be used in the motor control system of FIG. 1.

FIG. 2 is one example of a saturable reactor 6a. This reactor includes a core 7 made of a magnetic material having low coercive force, for example a ferrite or the like. The core 7 comprises two magnetic flux convergence portions 8a and 8b for converging external magnetic flux, and the core 7 also comprises two magnetic flux saturable portions 9a and 9b having smaller cross-sectional areas than those of the magnetic flux convergence portions 8a and 8b. A primary winding 10a is wound around the magnetic field saturable portion 9a and a secondary winding 11a is wound around the magnetic field saturable portion 9b. The saturable transformer 6a straddles the legs of a yoke 12, around which a bias coil 13 is wound. The yoke 12 and the bias coil 13 form a magnetic field generator.

Figure 3:
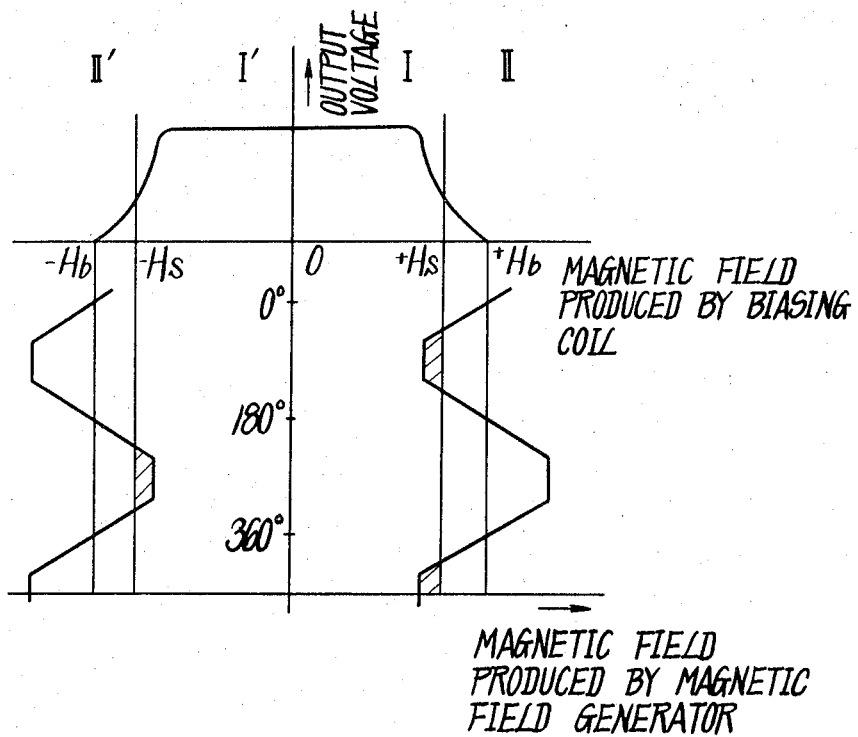
FIG. 3 is a graph for explaining the operation of the saturable transformer shown in FIG. 2.

When an external positive magnetic field is applied to the saturable transformer 6a, as shown in FIG. 3, so that the magnetic flux density of the core 7 reaches $+Hs$ (for example, 2,000 Gauss), the saturable portions 9a and 9b become saturated with magnetic flux. As a result, the values of inductances of the primary and secondary windings 10a and 11a become very small, resulting in reduction of the coupling coefficient of these windings from about 1 to 0.1 or less. Therefore, a small output voltage is produced by the secondary winding 11a. Here the saturable transformer 6a has a characteristic such that an output signal is produced across the secondary winding 11a of the saturable transformer 6a when the transformer is operating in an area I, shown in FIG. 3, but not when it is operating in an area II. In the following description, the area I will be referred to as the "on" area, and the area II will be referred to as the "off" area. It will be understood that when current flows through the bias coil 13 of the saturable transformer 6a to produce a positive biasing magnetic field $+Hb$ higher than the saturation magnetic field Hs and a magnetic field developed by the magnetic field generator 5 is further applied to the bias coil 13, an output signal is developed from the secondary winding 11a of the transformer 6a during one revolution of the magnetic field generator 5 and for the time during which a negative magnetic field is applied thereto, as shown in the shaded area of FIG. 3. As stated above, the magnetic field generator 5 is not circular-shaped but is squared off at both sides. Thus, since the magnetic field of the magnetic field generator 5 is inclined during a certain interval, the "on" time period of the saturable transformer is determined by varying the value of the biasing magnetic field and is, for example, 130°~150°, which is very efficient for the motor.

When a negative magnetic field is applied to the saturable transformer, the saturable transformer presents "on" and "off" characteristics in the areas I' and II', respectively, in a manner similar to the case of application of the positive magnetic field. Therefore, it will be understood that when the negative magnetic field $-Hb$ is applied by reversing the direction of the biasing current supplied to the bias winding 13, an output signal is developed from the secondary winding of the transformer during one revolution of the magnetic field generator 5 and for the time during which the magnetic field shown in the shaded area of FIG. 3 is applied thereto. It will be noted that this "on" time period is 180° different from that of application of the positive magnetic field with respect to rotating phase of the magnetic field generator.

The two other saturable transformers 6b and 6c are similar to the saturable transformer 6a. The primary windings 10a, 10b, and 10c of these saturable transformers 6a, 6b, and 6c are connected to form a series circuit, one end of which is connected to an output terminal of an amplifier 14 and the other end of which is grounded. Further, one end of the secondary winding 11a of the saturable transformer 6a is connected to the gates of SCR's 4a and 4a', one end of the secondary winding 11b of the saturable transformer 6b is connected to the gates of SCR's 4b and 4b', and one end of the secondary winding 11c of the saturable transformer 6c is connected to the gates of SCR's 4c and 4c'. The other ends of these secondary windings 11a, 11b and 11c are connected to the center tap of the transformer 3.

A high frequency signal from an oscillator 16 is supplied to an amplifier 14 and is width modulated by a width modulator 15 to which a sinusoidal wave voltage from a sinusoidal oscillator 17 is applied. The comparison output derived from a comparison circuit 18 is also applied, in the form of an absolute value, to the sinusoidal wave oscillator 17 through a diode bridge 19. The comparison output results in a difference voltage in which an output voltage corresponding to the level and rotating position, which are set in response to the rotating speed of the rotor 1, is substracted from a set reference voltage corresponding to the desired rotating position and rotating direction. Here a conventional tachometer 20 may be used to measure rotational speed of the rotor 1.

Figure 4:
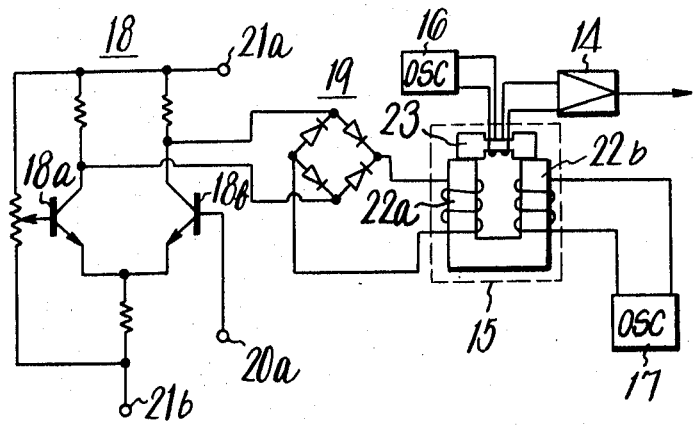
FIG. 4 is a circuit diagram showing a portion of the circuit in FIG. 1.

FIG. 4 shows one embodiment of a combination of the width modulator 15, the comparison circuit 18, and the diode bridge 19. The comparison circuit 18 is a differential amplifier, the base of one transistor 18a which is connected to the arm of a potentiometer across which positive and negative DC voltages are applied so that the reference voltage may be formed at the arm. The output of the tachometer 20 is connected to a base of the other transistor 18b thereof through a terminal 20a. Collectors of both of these transistors 18a and 18b are connected to the diode bridge 19 to derive a difference signal therefrom, the difference signal being impressed across a winding 22a wound around one leg of a U-shaped yoke of magnetic material. A signal voltage is applied to a winding 22b wound around the other leg of the yoke. A saturable core 23 is placed so that it straddles the space between the legs of the yoke. The high frequency oscillator 16 is connected to a primary winding of the saturable core 23, and the output derived from a secondary winding thereof is supplied to the amplifier 14. The width modulator 15 comprising the yoke and the saturable core may be similar in construction to corresponding parts shown in FIG. 2.

FIG. 1 also shows that the comparison output of the circuit 18 is supplied to a determination circuit 24 for determining whether the comparison output is positive or negative. A bias signal source 25 is controlled depending upon the result of the determination. Thus, when the comparison output is determined to be positive, a positive biasing signal is applied to respective biasing windings of the saturable transformers 6a, 6b, and 6c.

In the operation of the foregoing circuits, the output signal of the high frequency oscillator 16 is supplied to the primary windings of the saturable transformers 6a, 6b, and 6c, and a positive biasing magnetic field is applied to these saturable transformers. When the high frequency oscillator 16 is operated to supply an alternating signal to the transformers 6a, 6b, and 6c through the modulator 15, only the saturable transformer 6a is turned on, because the proper opposing flux (N–S, N is shown in the figure) is effected from the upper surface of the magnetic field generator 5 to the lower surface.

This causes a high frequency signal $H_1$, which is shown in FIG. 5A, to be supplied to the gates of the SCR's 4a and 4a' through the saturable transformer to obtain a full-wave rectified output $R_1$, shown in FIG. 5D, which is supplied to the field coil 2a. Thus, a north pole is induced in the field winding 2a, whereby the rotor 1 rotates in the direction of the arrow a (FIG. 1). Since the magnetic field generator 5 rotates with the rotor 1, the saturable transformer 6b is next turned on, whereby a high frequency signal $H_2$, shown in FIG. 5B, is supplied to gates of the SCR's 4b and 4b' to obtain a full-wave rectified output $R_2$, as shown in FIG. 5E, which is supplied to the field winding 2b, thus permitting the rotor 1 to rotate further in the direction of the arrow a because of introduction of a north pole in the field coil 2b. Similarly, since the saturable transformer 6c is next turned on, a high frequency signal $H_3$ is supplied to gates of the SCR's 4c and 4c', as shown in FIG. 5C, to obtain a full-wave rectified output $R_3$, shown in FIG. 5F, which is supplied to the field coil 2c. Thus, the rotor 1 rotates through the transferring of the field current.

Control of the direction of rotation of the brushless DC motor can be effected by displacing the "on" time period of each of the saturable transformers 6a, 6b, and 6c by 180° or reversing the direction of currents flowing through the field coils 2a, 2b, and 2c. There are two ways of reversing the direction of currents flowing through the field coils. According to one way, a relay is used. According to the other way, two sets of SCR's are used. In the former, some mechanical contacts are indispensable. In the latter, two sets of SCR's and detectors are required for positive and negative directions with the result that the construction is complex.

In this invention, transferring of the biasing magnetic field from one value (for example, $+Hb$) to the other value ($-Hb$) causes the "on" time period of each of these saturable transformers 6a, 6b, and 6c to be displaced by 180° in phase. Further, control of the rotating speed of the brushless DC motor is effected by applying a positive or negative drive force with respect to the rotating direction to produce the required acceleration or deceleration.

Figure 6A:
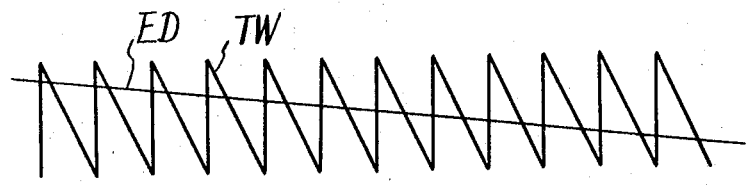
FIGS. 6A–6D show wave forms typical of operation of the circuit in FIG. 1.
Figure 6B:
Figure 6C:

Operation of the circuit to control the rotating direction and rotating speed in one embodiment of this invention will be described next. FIG. 6A shows a voltage waveform in which a signal voltage is superposed upon a difference voltage signal $E_D$ supplied to the winding 22a of the width modulator 15 (FIG. 4) from the comparison circuit 18. Since the width modulator 15 presents an output characteristic with respect to an external magnetic field, as shown in FIG. 7, it is turned on during one period of one component of the signal wave and the time period determined by the difference voltage signal. "On" and "off" conditions of the width modulator 15 are shown in FIG. 6B. Therefore, a high frequency signal HE is obtained from the output of the width modulator 15, the high frequency signal being intermittently width modulated as shown in FIG. 6C by the difference signal and supplied to the primary windings of the saturable transformers 6a, 6b, and 6c.

Figure 6D:
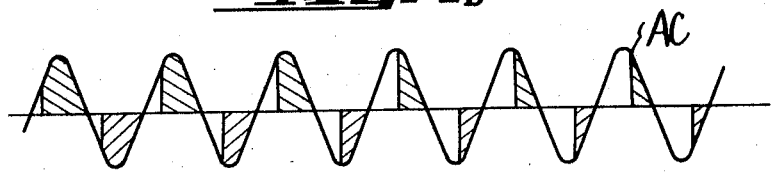

A 50Hz AC is gated with the width modulated high frequency signal as shown in FIG. 6D. The high frequency signal HE (shown in FIG. 6C) is supplied to gates of the SCR's in such a manner that it is sequentially transferred by the turning on and off of the saturable transformers 6a, 6b, and 6c, as shown in FIGS. 5A, 5B, and 5C. This width modulation results in the absolute difference voltage signal between the detection output of the tachometer 20 and the reference voltage signal, that is, the amount of acceleration, which is independent of negative and positive. The determination will be made by the determination circuit 24. When the detection output of the tachometer 20 is larger than the reference voltage signal, for example, the difference signal is determined to be negative. In this case, a negative biasing signal is supplied to the saturable transformers 6a, 6b, and 6c from a signal source 25, whereby the "on" time period of each of the saturable transformers is displaced by 180°. Thus the rotor 1 rotating in the direction of the arrow a is subject to the reverse torque (that is, the direction of the arrow b) resulting in the deceleration thereof. On the contrary, when the detection output of the tachometer 20 is smaller than the reference voltage signal, a positive biasing magnetic field is applied to the saturable transformers 6a, 6b, and 6c, whereby they are subjected to the normal torque (that is, the direction of the arrow a). Thus, the rotating speed is controlled to have a value corresponding to the reference voltage signal.

Reversal of the rotor from the direction of the arrow a into the direction of the arrow b is effected by displacing the "on" time period of each of the saturable transformers 6a, 6b, and 6c by 180° from the relationship shown in FIGS. 5A, 5B, and 5C to that in FIGS. 5G, 5H, and 5I. Thus, a high frequency signal $H_4$ is applied to the gates of SCR's 4a and 4a' through the turning on and off of the transformer 6a at the times shown in FIG. 5G. Similarly, a high frequency signal $H_5$ is applied to the gates of SCR's 4c and 4c' through the turning on and off of the transformer 6c at the times shown in FIG. 5H, and a high frequency signal $H_6$ is applied to the gates of SCR's 4b and 4b' through the turning on and off of the transformer 6b at the times shown in FIG. 5I. Therefore, when the rotor 1 is to rotate in the direction of the arrow a, a positive biasing magnetic field $+Hb$ is applied to each of the saturable transformers 6a, 6b, and 6c. Conversely, when the rotor 1 is to rotate in the direction of the arrow b, a negative biasing magnetic field $-Hb$ is applied to each of the saturable transformers 6a, 6b, and 6c.

As will be apparent from the above description, according to the above-described embodiment constant speed control is effected by modulating the time period during which current flows through the field windings 2a, 2b, and 2c in response to the detection output which is dependent on whether the motor speed is faster or slower than the predetermined speed set by the reference voltage. Further, acceleration or deceleration of the motor is accomplished by displacing the "on" time period of each of these saturable transformers by 180°. Therefore, two sets of SCR's is not needed for positive and negative directions. Thus, the construction of this embodiment is very simple.

Figure 8:
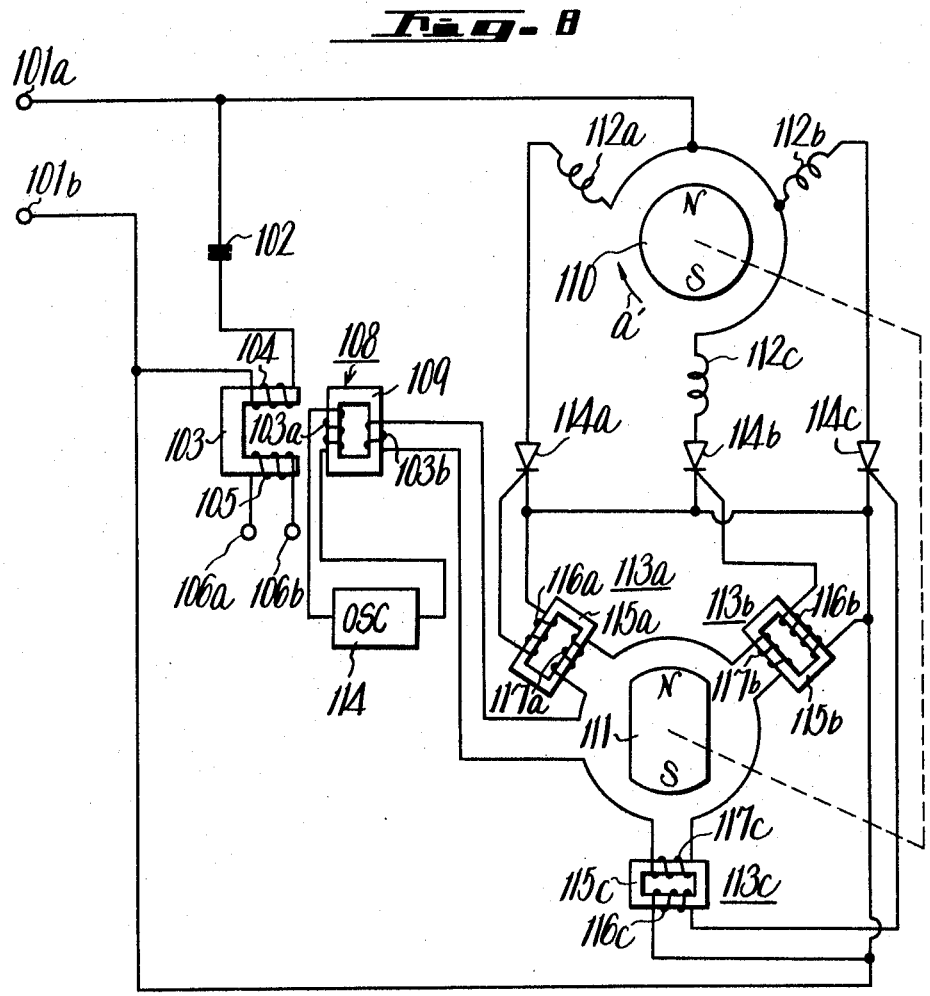
FIG. 8 is a circuit diagram showing a second embodiment of this invention.

FIG. 8 shows another embodiment according to this invention in which an AC voltage from a commercially available power supply, that is, 50Hz, 100v, is supplied across input terminals 101a and 101b. The input terminal 101a is connected through a capacitor 102 to one end of a winding 104 mounted on a core 103, and the other end thereof is connected to a grounding terminal 101b. A control winding 105 is wound around the core 103, and the ends of this winding are connected to terminals 106a and 106b to which a control signal is applied, for example a DC current for controlling voltage supplied to field coils of the motor. Here the core 103 and the windings 104 and 105 form a magnet means.

When an alternating voltage e is applied to the input terminals 101a and 101b, $$e = E_0 \sin\omega t$$

(where, $E_0$ is constant)
the alternating current i supplied to the winding 104 is 90° out of phase with respect to the alternating voltage e.

That is to say, $$i = I_0 \cos\omega t$$

(where, $I_0$ is constant)

A saturable transformer 108 is disposed opposite the open end of the yoke 103. The construction and characteristics of the saturable transformer 108 are similar to those of the saturable transformers shown in the first embodiment. A primary winding 103a is wound around a saturable core 109 and both ends of this winding are connected to a high frequency oscillator 114 for supplying a high frequency signal, for example a 100–500KHz high frequency current. A secondary winding 103b wound around the saturable core 109 is connected to a load.

A load motor substantially similar to the motor described in the first embodiment is shown in FIG. 8. The motor comprises a rotor 110 that has north and south poles magnetized around it, a magnetic field generator 111 adapted to rotate with the rotor 110, three field windings 112a, 112b, and 112c surrounding the rotor 110, three saturable transformers 113a, 113b, and 113c associated with respective field windings and disposed along the periphery of the magnetic field generator 111, and three SCR's adapted to switch current flowing through said respective field windings. One end of each of the field windings is connected to the input terminal 101a and the other end of each winding is connected to the input terminal 101b through cathodes of the SCR's. The saturable transformers 113a, 113b, and 113c are similar in construction and characteristics to those of the first embodiment. One coil 116a, 116b, and 116c wound around each of the saturable cores 115a, 115b, and 115c is connected across the gates and cathodes of corresponding SCR's 114a, 114b, and 114c. The other coils 117a, 117b, and 117c on the cores 115a, 115b, and 115c are connected in series to one another and are connected across the coil 103b of the first saturable transformer 108.

The operation of the second embodiment will now be described. Assuming that the coupling coefficient magnetic field characteristic of the saturable transformer 108 is shown in curve A of FIG. 10 wherein when a magnetic field applied to the saturable transformer 108 is between $+B_S$ and $-B_S$, the coils 103a and 103b of the saturable transformer 108 are magnetically coupled to each other. This allows a high frequency signal applied from the high frequency oscillator 114 to the coil 103a to be coupled to the coil 103b. When the magnetic field is more than $+B_S$ or less than $-B_S$, the coupling is much lower and the signal cannot be obtained from the coil 103b. The magnet means comprising the yoke 103, the winding 104, and the control winding 105 develops a magnetic field $B_S$ when a direct current flows through these windings.

An alternating current i is applied to the winding 104, where $$i = I_0 \cos \omega t$$

A control current $I_c$, for example, is applied to the control winding 105.

In this case, when currents $i$ and $I_c$ flowing through the winding 104 and the control winding 105, respectively, of the magnet means exceed a predetermined current $I_b$, the saturable transformer 108 becomes saturated with magnetic flux, so that the output signal cannot be obtained from the coil 103b. Thus, the load or motor is controlled by determining whether the currents $I_c$ and $i$ flowing through the windings 104 and 105 are larger or smaller than the current $I_b$.

Figure 10:
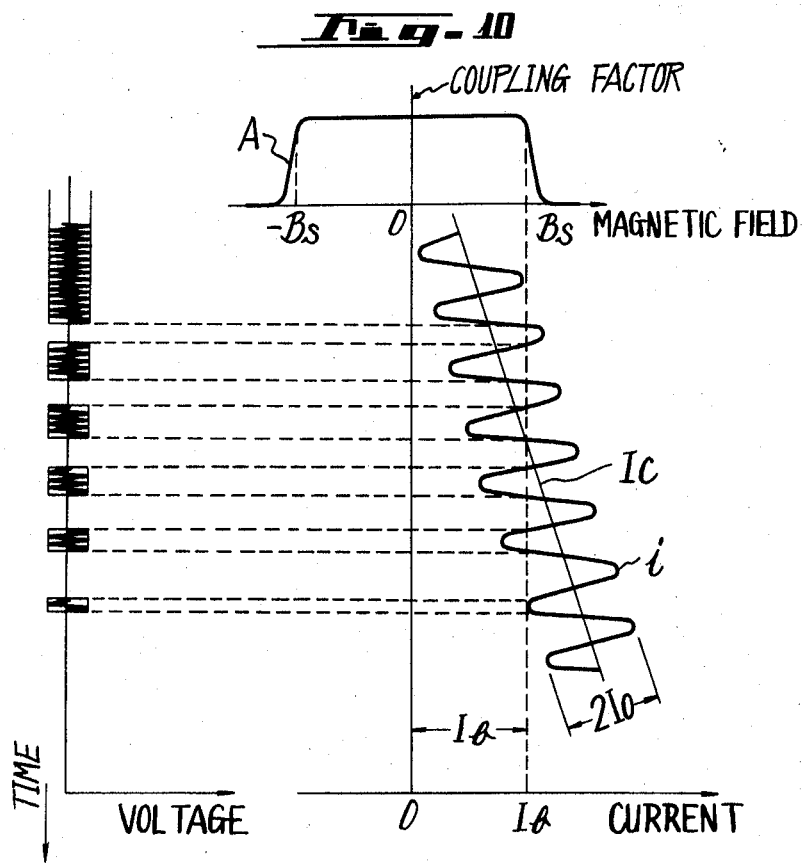

That is to say, when the following relation is established as shown in FIG. 10:

$$I_0 + I_c < I_b$$

an output signal can be obtained from the coil 103b of the saturable transformer 108. On the contrary, when the relation $$I_c + I_0 > I_b$$

is established, an output signal cannot always be obtained from the coil 103b of the saturable transformer 108.

Thus, when the following relation is true, $$I_c - I_0 < I_b < I_c + I_0$$

an output signal may be obtained from the coil 103b of the saturable transformer 108 within a certain angle range of the current $i = I_0 \cos \omega t$, that is, $i + I_c < I_b$ and an output signal is not developed therefrom within the other angle range, that is, $I_c - I_0 > I_b$.

The output of the saturable transformer 108 controlled by the value of the control current $I_c$ is supplied to coils 117a, 117b, and 117c of the saturable transformers 113a, 113b, and 113c which are spaced around the magnetic field generator 111. When a north pole portion N of the magnetic field generator 111 approaches the saturable transformer 113a, this saturable transformer 113a couples the output of the oscillator 114 to the gate of SCR 114a through the coil 116a, resulting in turning on of the SCR 114a. Thus, current of positive half cycles flows through the field winding 112a. Similarly, when the north pole N of the magnetic field generator 111 rotates close enough to the saturable transformer 113b, this transformer 113b is turned on, whereby SCR 114b is turned on, thus permitting current of positive half cycles to flow through the winding 112b. When the north pole N of the magnetic field generator 111 is opposite the saturable transformer 113c, this transformer 113c is turned on, whereby the SCR 114c is turned on, thus permitting current of positive half cycles to flow through the winding 112c. Thus, the rotor 110 is rotated in the direction of the arrow $a'$. The rotating speed is determined by the timing of the turning on of each of the SCR's. It will, of course, be understood that the timing is determined by the current value of the control current $I_c$.

As is well known in the art, current flows through each of the SCR's during the positive half cycles of the voltage supplied to anodes of the SCR's. That is to say, current flows through each of the SCR's during the positive half cycles within the phase range between the gating angle $\theta$ and 180°, where $\theta$ is the phase at which a trigger voltage is supplied to each of the SCR's during the positive half cycles. At this time, the phase $\theta$ by which each of the SCR's is turned on and off is determined by the following equation:

$$I_c + I_0 \cos \theta = I_b$$

Thus, $\theta$ can be obtained by solving the above equation. That is, $$\theta = \cos^{-1}(I_b - I_c/I_0) \tag{1}$$

On the contrary, the integration value $I_A$ of a direct current flowing through each of the SCR's is as follows.

$$I_A = I \int_0^{180} \sin \theta d\theta = I(-\cos \theta) \tag{2}$$

(where, I is constant)

By putting equation (1) into equation (2), the following equation is obtained.

$$I_A = I \left( \frac{I_0 + I_c - I_b}{I_0} \right)$$

Figure 11:
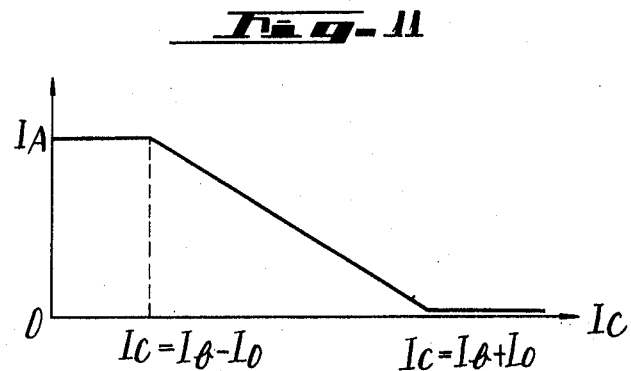

Therefore, it will be easily understood that the integration value $I_A$ of the direct current is in proportion to the control signal $I_c$. That is to say, a linear relationship is established between the integration value $I_A$ of the direct current flowing through each of the SCR's and the control current $I_c$ as shown in FIG. 11, which means that a linear relationship is established between a load current and the control current according to this invention.

Further, according to the second embodiment of this invention, the power supply and the SCR's are connected by transformers to a circuit for supplying a control current and an oscillator. Therefore, they are completely separated from each other insofar as a direct signal is concerned, and they are not adversely affected by each other.

When a 100 – 500KHz high frequency signal is developed from the high frequency oscillator 114 in the above-described embodiment, the coils 103a and 103b of the saturable transformer 108 have less turns, whereby the impedance of the saturable transformer 108 is low. As a result, each of the SCR's is triggered in a stable condition, because the gate-cathode impedance of each of the SCR's is low.

Figure 12:
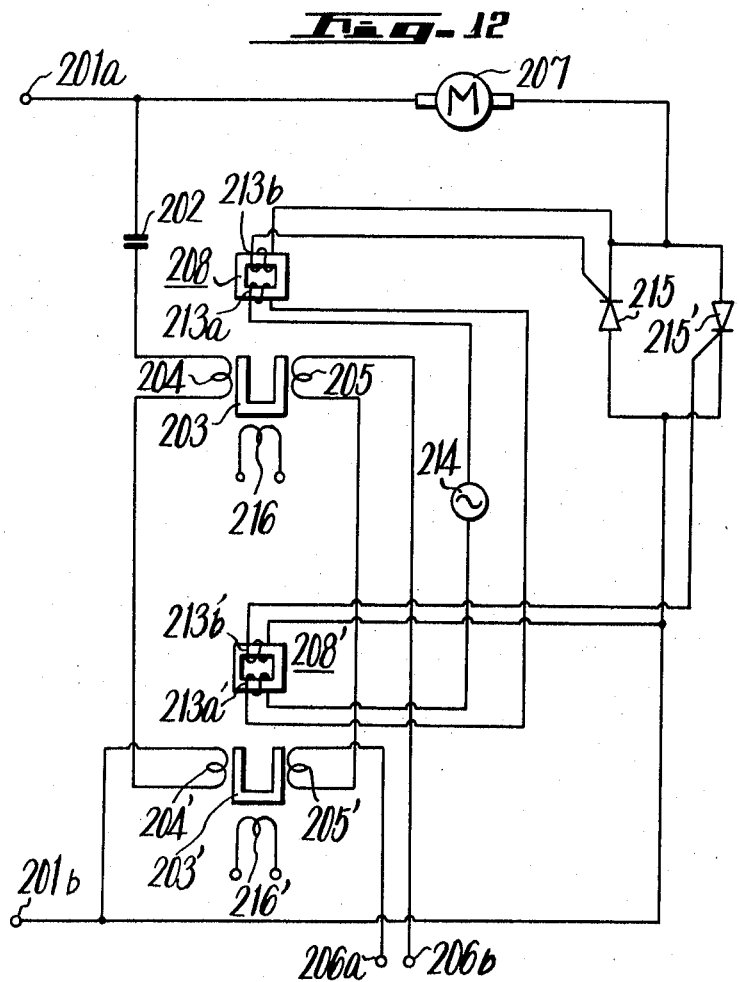
FIG. 12 is a circuit diagram showing a third embodiment of this invention.
Figure 13:
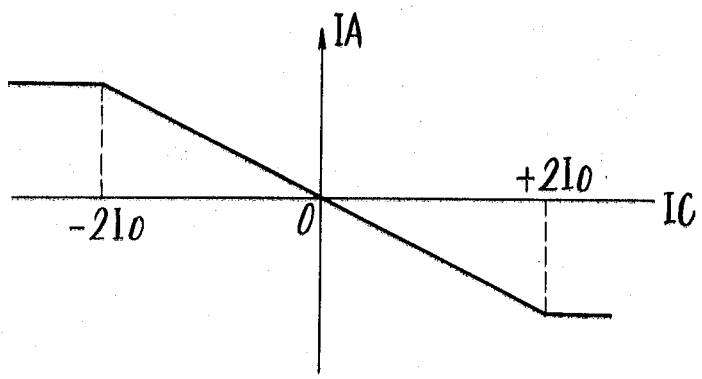
FIG. 13 is a graph for explaining the operation of the embodiment in FIG. 12.

FIG. 12 shows a third embodiment in which the motor can rotate in either direction. In FIG. 12, current flows through a control winding 205 in one direction to control a saturable transformer 208, while current flows through a control winding 205' in the reverse direction to control a saturable transformer 208'. Biasing windings 216 and 216' are provided in the neighborhood of cores 203 and 203', respectively. When currents $(I_b + I_0)$ flow through the biasing windings 216 and 216' as biasing currents, a linear relation is established between a load current $I_A$ (average current) and a control current $I_c$ over the positive and negative areas of the load current as shown in FIG. 13. Further, a high frequency signal current from a high frequency signal source 214 is supplied to respective windings 213a and 213a' of the saturable transformers 208 and 208', the other windings 213b and 213b' of which are connected to gates of a pair of SCR's 215 and 215'. Connected across the input terminals 201a and 201b are a capacitor 202 and coils 204 and 204' which are wound in the reverse relation to each other and connected to cores 203 and 203'. An armature 207 for the motor is also connected between the terminals. Therefore, according to the third embodiment shown in FIG. 12, the positive and negative rotations and the rotating speed of the DC motor can be controlled by the control current impressed across the control terminals 206a and 206b. It will be, of course, understood that the third embodiment is similar to the second embodiment in its technical effect.

Figure 14:
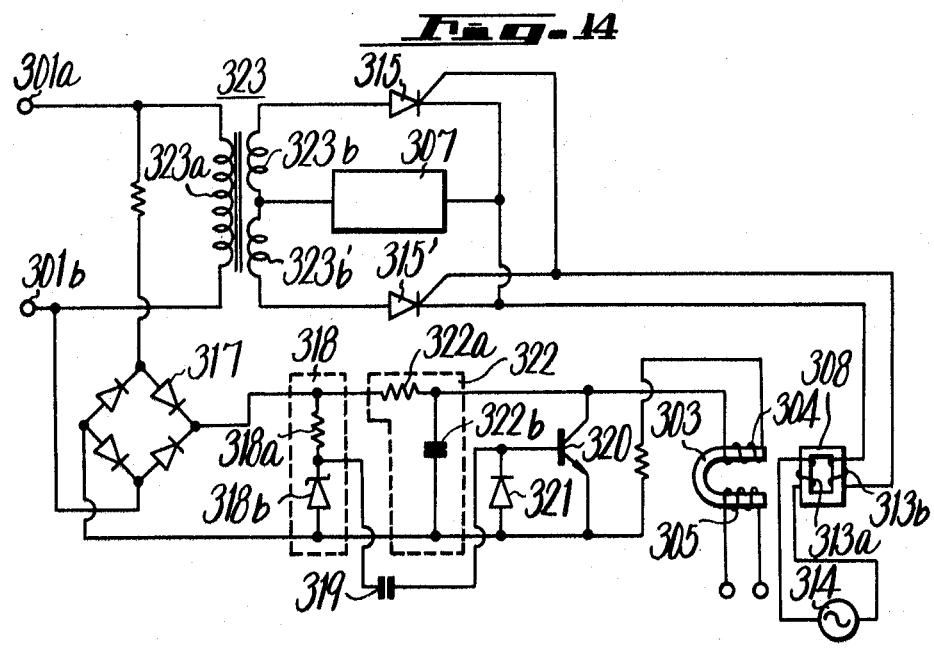
FIG. 14 is a circuit diagram showing a fourth embodiment of this invention.

FIG. 14 shows a fourth embodiment wherein the phase of the bi-directional current of the alternating current can be controlled by only one saturable transformer and a magnet means as shown in the fourth embodiment of FIG. 14.

In FIG. 14, input terminals 301a and 301b are connected to a full-wave rectifier 317, and a clipper circuit 318 comprising a resistor 318a and a Zener diode 318b is connected between two output terminals of the full-wave rectifier 317. The junction between the resistor 318a and the Zener diode 318b is connected to the base of a switching npn transistor 320 through a capacitor 319 forming a part of a differential circuit. Further, the base of the transistor 320 is grounded through a diode 321 for deriving a negative-going signal, shown in FIG. 15E, from the output of the capacitor 319 forming a part of the differential circuit. The emitter of the transistor 320 is grounded and an integration circuit 322 comprising a resistor 322a and a capacitor 322b is connected across the output terminals of the full-wave rectifier 317. Output terminals of the integration circuit 322 are connected between the collector of the transistor 320 and ground and is also connected across a winding 304 of a magnet means.

The input terminals 301a and 301b are also connected across a primary winding 323a of a transformer 323 which has two secondary windings 323b and 323b' wound in the reverse relation to each other. A common junction of the secondary windings 323b and 323b' is connected to one end of a motor 307 and the other ends thereof are connected to the anodes of SCR's 315 and 315' whose cathodes are connected to the other end of the motor 307. A secondary coil 313b of a saturable transformer 308 is connected to the gates of the SCR's 315 and 315'.

Wound around a core of the saturable transformer 308 is a primary winding 313a to which a high frequency signal current from a high frequency signal source 314 is supplied. Also wound around a core 303 of the magnet means is a control coil 305 to which a control current is supplied.

Figure 15A:
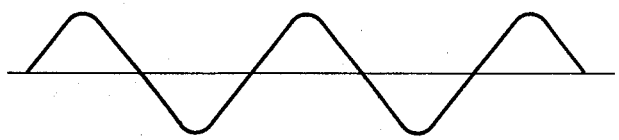
FIGS. 15A–15G are graphs for explaining the operation of the embodiment in FIG. 14.
Figure 15B:
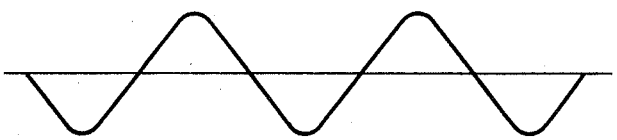

According to the above-described construction, voltage waveforms which are 180° out of phase with each other as shown in FIGS. 15A and 15B are obtained from the secondary windings 323b and 323b' of the transformer 323. Therefore, voltages corresponding to positive and negative cycles of the input power source voltage are applied to SCR's 315 and 315'.

Figure 15C:
Figure 15D:
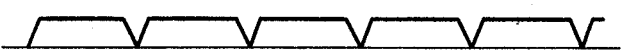
Figure 15E:
Figure 15F:
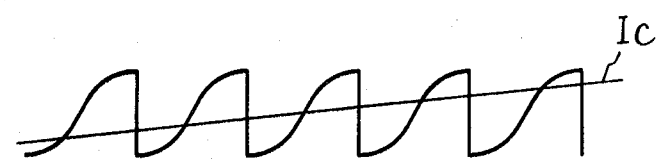
Figure 15G:

The input signal is fully rectified by the full-wave rectifier 317 as shown in FIG. 15C and is clipped by the clipper circuit 318 to provide a clipped voltage waveform having a predetermined level as shown in FIG. 15D. The clipped voltage is supplied to the integration circuit 322 and the capacitor 319 forming a part of the differential circuit. The waveform differentiated by the capacitor 319 is shown in FIG. 15E. On the other hand, the voltage clipped by the clipper circuit 318 is applied to the capacitor 322b to form a sine curve. However, when a predetermined time elapses the capacitor 319 is discharged, because the output of the capacitor 319 is applied to the base of the transistor 320. As a result, a voltage shown in FIG. 15F is supplied to the winding 304 of the core 303. Therefore, when the control current $I_c$, as shown in FIG. 15F, is supplied to the control coil 305, the current flow angle of currents flowing through SCR's 315 and 315' can be controlled by one saturable transformer to produce the waveform shown in FIG. 15G.

What is claimed is:

1. A motor control system comprising: a rotor; a plurality of field windings connected to a relatively low frequency power source; rotatable magnetic flux producing means mechanically connected to said rotor; a plurality of saturable reactors adjacent said magnetic flux producing means; means for supplying a high frequency signal to said saturable reactors; a plurality of silicon-controlled rectifier switching means connected to said field windings, respectively, for controlling current flowing through said field windings for intervals of time corresponding intervals that said high frequency signal is derived from the respective ones of said saturable reactors; control means to produce a speed error signal; and means for modulating, in response to said speed error signal derived from said control means, the duration of time said high frequency signal is supplied to said switching means.

2. A motor control system according to claim 1 wherein said modulating means comprises a magnetic yoke and an additional saturable reactor opposite said magnetic yoke.

3. A motor control system according to claim 2 wherein said magnetic yoke for said modulating means comprises: a biasing coil to receive an alternating signal, and a control coil to receive said control signal from said control means; and said additional saturable reactor comprises: a saturable core, a primary coil wound on said saturable core to receive a high frequency signal from said means for producing a high frequency signal, and means for transmitting the output of said additional saturable reactor to said plurality of saturable reactors.

4. A motor control system according to claim 3 comprising said high frequency signal producing source, and means connecting said source to said primary coil.

5. A motor control system according to claim 2 wherein said additional saturable reactor comprises a transformer comprising a saturable core.

6. A motor control system according to claim 2 wherein said magnetic yoke for said modulating means comprises a biasing coil to receive an alternating current having a phase differing by a predetermined angle from the phase of a voltage to be supplied to said field windings, and a control coil to receive said control signal from said control means.

7. A motor control system according to claim 1 which further comprises magnetic bias means opposite said plurality of saturable reactors to apply a bias magnetic field to each of said plurality of saturable reactors.

8. A motor control system according to claim 1 wherein each of said saturable reactors includes a magnetic core and a biasing coil wound around said magnetic core to receive a direct current from a power source connected to said biasing coil.

9. A motor control system according to claim 8 comprising: a direct current source; and means to connect said source to said biasing coil in either polarity to produce a biasing magnetic field of selected polarity.

10. A motor control system according to claim 1 which further comprises; a detector for detecting the rotating speed of said rotor; and comparing means for comparing the output of said detector with a reference value to produce an error signal to be supplied to said control means.

11. A motor control system according to claim 10 wherein said control means comprises a diode bridge, whereby the absolute value of said error signal is supplied to said modulating means as a control signal.

12. A motor control system according to claim 1 wherein said plurality of saturable reactors comprises a plurality of transformers, each including a saturable core.

13. A motor control system comprising: a rotor; a plurality of field windings connected to a relatively low frequency power source for rotating said rotor; a magnetic flux producing means mechanically connected to said rotor; a plurality of saturable reactors adjacent the path of rotation of said magnetic flux producing means; means supplying a high frequency signal to said saturable reactors; a plurality of silicon-controlled rectifier switching means connected to said respective field windings for controlling current through said field windings corresponding to an output derived from a respective one of said saturable reactors; magnet means for magnetically biasing each of said saturable reactors; and means for changing over said magnetic field produced by said magnet means from one polarity to the opposite polarity.

14. A motor control system according to claim 13 wherein said magnet means comprises; a magnetic yoke; and a biasing coil wound around said magnetic yoke.

15. A motor control system according to claim 13 wherein said saturable reactors comprise; saturable cores; a primary winding wound around each of said saturable cores to receive said high frequency signal; and a secondary winding wound around said saturable cores and connected to a respective one of said switching means.

16. A motor control system comprising a motor comprising a rotor and stator; a relatively low frequency alternating power source for supplying alternating power to said motor; silicon-controlled rectifier switching means connected to said power source for controlling current flowing through said motor; a comparison circuit; a reference signal source connected to said comparison circuit; means connected to said comparison circuit and operable for deriving a voltage corresponding to the speed of said motor; means for producing a second current having a polarity determined by said derived voltage; a saturable reactor having a coil to receive a high frequency signal and an output means for deriving output signals therefrom, said output means being connected to said switching means to actuate said switching means in response to a saturable condition of said saturable reactor; magnet means to receive said second current for producing magnetic flux and to supply said magnetic flux to said saturable reactor; and a control means provided at said magnet means for controlling the magnetic flux produced by said magnet means.

17. A motor control system according to claim 16 wherein said saturable reactor comprises; a saturable transformer having a saturable core; a coil wound around said saturable core to receive the high frequency signal supplied from a high frequency signal producing source; and an output coil wound around said saturable core for supplying an output of said saturable reactor to said switching means.

18. A motor control system according to claim 16 wherein said magnet means comprises: a magnetic yoke and a coil wound around said magnetic yoke to receive said current; and a control coil wound around said magnetic yoke to receive a control direct current from said control means.

* * * * *